United States Patent Office 2,734,784
Patented Feb. 14, 1956

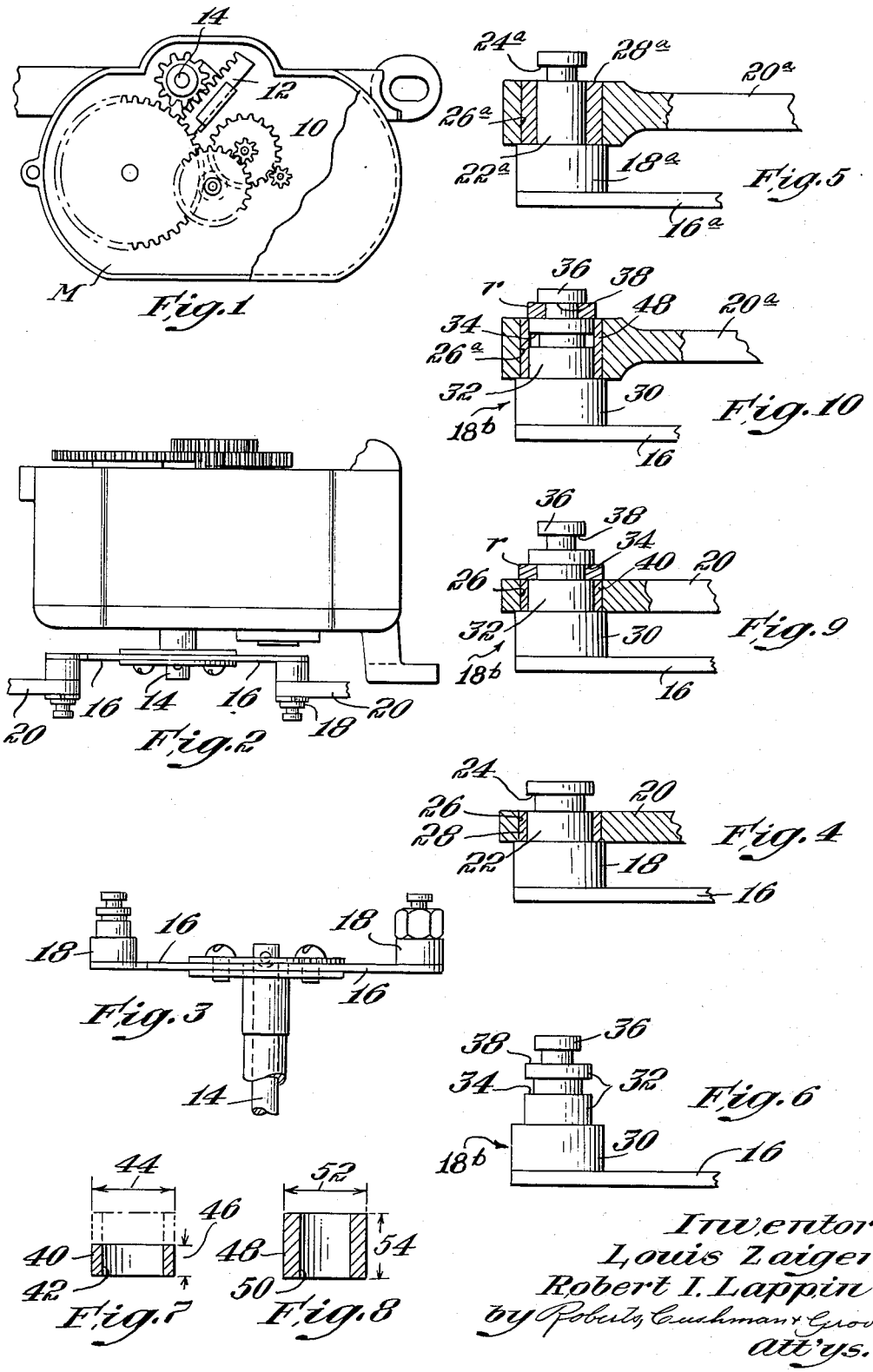

2,734,784
TRUNNION AND BUSHING ASSEMBLY FOR WINDSHIELD WIPER EQUIPMENT

Louis Zaiger, Swampscott, and Robert I. Lappin, Marblehead, Mass.

Application May 28, 1952, Serial No. 290,598

1 Claim. (Cl. 308—15)

This invention relates to windshield wipers and especially to a compound trunnion pin and bushing assembly for connecting a motor driven shaft to the wiper linkages.

In Patent No. 2,566,843 granted September 10, 1941, to Robert I. Lappin, there is illustrated an adaptor for connecting the linkage of dual wipers to a wiper motor. As there shown a trunnion pin is made fast to each extremity of the adaptor and provides for pivotally connecting the linkage thereto and these trunnion pins have locking grooves therein so that after the arms of the linkage are placed over the pins locking rings may be snapped into the grooves to hold the arms in place. Usually, although not there shown, a bushing of brass or other bearing metal having an inside hole corresponding in diameter to the trunnion pin is employed, the bushing being set into a hole of larger diameter made in the arm. While there has been some standardization of linkage connections, as between electric and vacuum wipers there is a variation in that the trunnion pin connecting the linkage of the electric wiper to the driving arm of the motor is of one size while that for the vacuum wiper is of another size. Hence at the present time the parts of the two types of wipers namely electric and vacuum are not interchangeable.

The object of the present invention is to provide a compound trunnion pin and bushing assembly for use with both electric and vacuum wiper equipment which will make it possible to connect the wiper linkage of an electric wiper linkage to a vacuum motor or vice versa. In the electric equipment the trunnion pin is squat being of comparatively large diameter and short whereas in the vacuum equipment the trunnion pin is slender being of comparatively small diameter and long, correspondingly the bushings used in the linkage of the electric equipment is of comparatively large inside diameter and short axially whereas that used for the vacuum wiper is of small inside diameter and comparatively long axially.

As herein illustrated the compound trunnion pin is made fast to the extremity of an arm which in turn is fast to a shaft driven by the motor preferably so as to oscillate. With the compound trunnion pin there are supplied bushings which may selectively be assembled with the particular linkage to be employed, replacing the existing bushings, the replacing bushings having a diameter corresponding to the trunnion pin so that the linkage may be connected thereto. The pin has bearing surfaces of different axial length for alternatively receiving the bushings of different length. The bearing surfaces have a common origin at one end so that the shorter of the bearing surfaces forms a part of the longer bearing surface. A groove in the pin spaced axially from the common origin of the bearing surfaces and from a shoulder at that origin defines the axial length of the shorter bearing and divides it from the longer bearing. A second groove in the pin spaced from the first groove and located at a greater axial distance from the shoulder than the first groove defines and limits the axial length of the longer bearing surface. The grooves are adapted to receive snap rings for alternative cooperation with the shoulder to hold a bushing corresponding in length to the longer bearing on the pin between a ring located in the second groove and the shoulder or to hold a bearing corresponding in length to the shorter bearing surface on the pin between a ring located in the first groove and the shoulder.

The invention will now be described in greater detail with reference to the accompanying drawings wherein:

Fig. 1 is a plan view of an electric wiper motor with the cover omitted to show the driving mechanism;

Fig. 2 is an elevation showing the wiper linkage connected to a shaft driven in reciprocation by the motor;

Fig. 3 is an elevation of an adaptor for connecting the wiper linkage to the driven shaft;

Fig. 4 is a fragmentary elevation to larger scale showing a trunnion pin of an electric driven wiper linkage fast to an arm of the adaptor and pivotally connected to a fragmentary part of the linkage;

Fig. 5 shows a trunnion pin used with vacuum wipers fast to an adaptor and pivotally connected to the wiper linkage;

Fig. 6 shows the novel compound trunnion pinion of this invention constructed to receive either the linkages of Fig. 1 or Fig. 2;

Fig. 7 shows in section a bushing for use in connecting the linkage of Fig. 4 with the trunnion shown in Fig. 6;

Fig. 8 shows in section a bushing for connecting the linkage of Fig. 5 with the trunnion shown in Fig. 6;

Fig. 9 shows the linkage of Fig. 4 connected to the compound trunnion of Fig. 6; and Fig. 10 shows the linkage of Fig. 5 connected to the compound trunnion of Fig. 6.

Referring to the drawings, Fig. 1 shows an electric motor M having a motor shaft 10 which is connected through a train of gears to a rack 12 which meshes with a gear fast to a shaft 14 and effects oscillation thereof. The driven shaft 14 extends through the motor housing to the opposite face as shown in Fig. 2 and has made fast thereto an adaptor such as shown and described in Patent No. 2,566,843. The adaptor has diametrically extending arms 16—16 to the extremities of which are made fast trunnion pins 18—18. The trunnion pins are adapted to receive the ends of links 20 which are in turn connected to wiper arms and hence transmit oscillatory movement to the wipers. As shown in the foregoing patent and in Fig. 4 herein the trunnion pin 18 has a bearing surface 22 of given diameter for receiving the link 20 and a locking groove 24 adapted to receive a snap ring the outer rim of which would overlie that portion of the upper side of the link surrounding the pin and hence hold it against axial displacement. Preferably, the link has a hole 26 of larger diameter than the bearing surface of the pin and has pressed into it a bushing 28 of some bearing material such as brass. To lock the bushing in place and to prevent relative movement with reference to the arm, the outer part of the bushing is preferably made multi-sided for example hexagonal and the hole 26 is likewise made hexagonal. While most electric motor and linkage assemblies are provided with a squat trunnion pin of comparatively large diameter and short length such as shown in Fig. 4, vacuum motors and linkages have slender trunnion pins of smaller diameter and greater length as is illustrated for example in Fig. 5. As there shown the trunnion 18a which is fast to an arm 16a has a slender bearing surface 22a which is much longer and has a locking groove 24a near its upper end. The arm 20a which is used with this particular linkage has an opening 26a in which there is placed a bushing 28a having a small diameter hole through it for reception of the shank 22a and a hexagonal outer side for engagement with the hole in the arm. It is at once apparent that the trunnion pin 18 could not be used with the arm 20a or the trunnion pin 18a with the arm 20 and hence that the two types of equipment are not interchangeable. This may cause such embarrassment in emergency cases.

In order to make the parts interchangeable and in accordance with this invention the trunnion pins 18 and 18a are replaced on the arms 16 and 16a by a compound trunnion pin 18b. The pin 18b has a base 30 from which extends a body 32 and a neck 36. The body constitutes a bearing and is divided intermediate its ends by a peripheral groove 34, to provide two bearing surfaces having common ends which originate at the base 30 and which terminate at their opposite ends respectively at the groove 34 and a second groove 38 spaced from the first groove 34 and further from the base than the first groove. The base 30 is of larger diameter than the body thus providing a shoulder at its junction with the body which is cooperable alternatively with a ring placed in one or the other of the grooves 34 and 38 to hold a bearing and/or bushing corresponding in axial length on the one or the other of the bearing surfaces. The bearing surfaces are of corresponding diameter and the second groove 38 at the end of the longer of the bearing surfaces is formed in an extension 36 of smaller diameter which constitutes the neck. The axial distance between the locking groove 34 and the shoulder of the base 30 corresponds to the distance between the locking groove 24 of the trunnion pin 18 and its shoulder and so to the thickness of the member 20 while the axial distance between the locking groove 38 and the shoulder of the base 30 corresponds to the distance between the locking groove 24a of the trunnion pin 18a and its shoulder and hence to the thickness of the member 20a. With this compound trunnion pin 30 there are supplied two bushings 40 and 48 of hexagonal outer shape shown in Figs. 7 and 8. The bushing 40 shown in Fig. 7 has an inside trunnion receiving hole 42 corresponding in diameter to the bearing surface 32, an outside diameter 44 corresponding to the hole 26 in the arm 20 and an axial length 46 corresponding to the thickness of the arm 20, that is to the length of the bearing surface up to the first groove 34. The bushing 48 shown in Fig. 8 has a trunnion receiving hole 50 corresponding in diameter to the bearing surface 32, an outside diameter 52 corresponding in diameter to the hole 26a of the arm 20a and a length 54 which corresponds to the thickness of the arm 20a that is to the length of the bearing surface up to the second groove 38. By supplying the arms 16 with the compound trunnion pin 30 as shown in Fig. 6, either the arm 20 or the arm 20a may successfully be attached thereto by first removing the bushing with which it is normally supplied and replacing it with the right one of the bushings 40 or 48. If the arm 20 is to be used as shown in Fig. 9, the bushing 40 is forced in the opening 26 in the arm and then it is mounted on the pin 30 so as to seat over the shank 32 and a locking ring $r$ is snapped into the groove 34 so as to overlie the upper side of the arm and hold it in place. The neck 36 rises above the arm but does not interfere with anything. When the arm 20a is to be used however as shown in Fig. 10, the bushing 48 is forced in the hole 26a of the arm and when the arm is then placed over the pin 32 it will cover the locking groove 34 rising upwardly on the shank to the level of the locking groove 38. The locking ring $r$ may then be snapped into the locking groove 38 to hold the arm in place.

It is evident by this simple expedient of providing a compound trunnion pin with bushings to receive different size arms that the parts of both electric and vacuum wipers may be interchanged.

While the interchangeability of the two types of wiper equipment have been described with reference to electric and vacuum systems it is within the scope of the invention to use the same expedient as to two size differences in electric or vacuum equipment wherein the trunnion pins vary in size in a corresponding manner.

It should be understood that the present disclosure is for the purpose of illustration only and that this invention includes all modifications and equivalents which fall within the scope of the appended claim.

We claim:

A trunnion pin having bearing surfaces of different axial length, the shorter bearing surface constituting part of the longer bearing surface and having an end coterminous with an end of the longer bearing surface, a first groove in the pin spaced from the said coterminous ends of the bearing surfaces defining the axial length of the shorter bearing surface and separating it from the remainder of the longer bearing surface, a shoulder at the said coterminous ends of the bearing surfaces and a second groove in the pin spaced from the first groove and at a greater axial distance from the shoulder than the first groove defining the opposite end of the longer bearing surface, said grooves being adapted to alternatively receive a snap ring for alternate cooperation with the shoulder to hold a bearing corresponding in axial length to the longer bearing surface on the pin between a ring located in the second groove and the shoulder or to hold a bearing corresponding in axial length to the shorter bearing surface on the pin between a ring located in the first groove and the shoulder.

References Cited in the file of this patent

UNITED STATES PATENTS

| 1,326,892 | Reynolds | Dec. 30, 1919 |
| 1,674,657 | Oishei | June 26, 1928 |
| 1,908,295 | Leister | May 9, 1933 |
| 2,546,801 | Visone | Mar. 27, 1951 |

FOREIGN PATENTS

| 68,540 | Norway | Nov. 6, 1944 |